United States Patent
Baier et al.

(10) Patent No.: US 12,265,371 B2
(45) Date of Patent: Apr. 1, 2025

(54) METHOD FOR OPTIMIZING THE OCCUPANCY OF MAGAZINE SPACES BY TOOLS IN A COMPUTER-SUPPORTED MANNER

(71) Applicant: Siemens Aktiengesellschaft, Munich (DE)

(72) Inventors: Georg Baier, Munich (DE); Silvio Becher, Munich (DE); Lena Hupp, Munich (DE); Christian Royer, Ottobrunn (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 772 days.

(21) Appl. No.: 17/433,066

(22) PCT Filed: Mar. 1, 2019

(86) PCT No.: PCT/EP2019/055123
§ 371 (c)(1),
(2) Date: Aug. 23, 2021

(87) PCT Pub. No.: WO2020/177838
PCT Pub. Date: Sep. 10, 2020

(65) Prior Publication Data
US 2022/0152763 A1    May 19, 2022

(51) Int. Cl.
*B23Q 3/155*    (2006.01)
*G05B 19/4093*    (2006.01)

(52) U.S. Cl.
CPC .............................. *G05B 19/40938* (2013.01)

(58) Field of Classification Search
CPC .............. G05B 19/40938; Y02P 90/02; B23Q 3/15503
See application file for complete search history.

(56) References Cited

U.S. PATENT DOCUMENTS

2010/0204028 A1    8/2010   Geissler
2012/0116570 A1    5/2012   Nishioka et al.
(Continued)

FOREIGN PATENT DOCUMENTS

CN    101811264 A    8/2010
CN    202780640 U    3/2013
(Continued)

OTHER PUBLICATIONS

Mendes et al, A mixed-integer linear programming model for part mix, tool allocation, and process plan selection in CNC machining centres, Feb. 14, 2003, International Journal of Machine Tools and Manufacture, 1179-1184 (Year: 2003).*

(Continued)

*Primary Examiner* — Tameem D Siddiquee
(74) *Attorney, Agent, or Firm* — Schmeiser, Olsen & Watts LLP

(57) ABSTRACT

Provided is a method for optimizing the occupancy of magazine spaces by tools within at least one tool magazine for a machine tool in a computer-supported manner, including: detecting a quantity of magazine spaces in at least one tool magazine, detecting a first quantity of tools which occupy at least one magazine space and the magazine spaces occupied by the tools, detecting a second quantity of tools which are to be additionally received in the at least one tool magazine, detecting the required space and optionally at least one other property for each tool, detecting a quantity of allowed magazines spaces for each tool, detecting a quantity of allowed magazine space pairs, wherein a first tool can be placed on a first magazine space of the magazine space pair, and optimizing the occupancy of the magazine spaces.

8 Claims, 3 Drawing Sheets

(56) References Cited

U.S. PATENT DOCUMENTS

| | | | |
|---|---|---|---|
| 2014/0371042 A1 | 12/2014 | Bernhard et al. | |
| 2017/0239767 A1* | 8/2017 | Hoebel | B23Q 3/15773 |
| 2018/0088562 A1 | 3/2018 | Hintz et al. | |
| 2019/0118319 A1 | 4/2019 | Kitamura et al. | |
| 2021/0178539 A1* | 6/2021 | Eble | B23Q 3/15706 |
| 2022/0097188 A1* | 3/2022 | Jeong | B23Q 3/15713 |

FOREIGN PATENT DOCUMENTS

| | | |
|---|---|---|
| CN | 104227478 A | 12/2014 |
| CN | 107438802 A | 12/2017 |
| CN | 107838735 A | 3/2018 |
| WO | WO 2017183642 A1 | 10/2017 |

OTHER PUBLICATIONS

Mendes, M. et al.:"A mixed-integer linear programming model for part mix, tool allocation, and process plan selection in CNC machining centres"; in: International Journal of Machine Tools and Manufacture; vol. 43; No. 11; pp. 1179-1184; XP055283617; ISSN: 0890-6955; DOI:10.1016/S0890-6955(03)00052-X; the whole document.

PCT International Search Report of International Searching Authority mailed Nov. 22, 2019 corresponding to PCT International Application No. PCT/EP2019/055123 filed Mar. 3, 2019.

\* cited by examiner

METHOD FOR OPTIMIZING THE OCCUPANCY OF MAGAZINE SPACES BY TOOLS IN A COMPUTER-SUPPORTED MANNER

CROSS-REFERENCE TO RELATED APPLICATIONS

This application claims priority to PCT Application No. PCT/EP2019/055123, having a filing date of Mar. 1, 2019, the entire contents of which are hereby incorporated by reference.

FIELD OF TECHNOLOGY

The following relates to a method and to a device for the computer-aided optimization of the occupancy of magazine spaces with tools within at least one tool magazine for a machine tool.

BACKGROUND

A machine tool is an automated manufacturing apparatus by way of which a predefined shape is generated on a workpiece by way of one or more tools. Multiple tools may be assigned to a tool type, for example milling. Another tool type may for example be drilling. A machine tool has a tool spindle in which the machining tool, also called spindle tool, is located during machining.

The tools that are able to be used by the machine tool to machine a workpiece are stored in a tool magazine. There are various kinds of these. One form that is very commonly used are chain magazines, these being used for example in the automotive industry.

Another kind of magazine are rack magazines R, as indicated for example in FIG. 1, in which it is possible to accommodate a very large number of different tools (up to 500 tools or possibly even more). The tools are stored therein in set magazine spaces P. Such a magazine may consist of a main side and an opposing opposite side.

The rack magazine has a device, in particular a magazine device, not illustrated in FIG. 1, by way of which a tool is able to be placed in and fetched from its magazine space P. This kind of magazine is used especially when a wider variety of different workpieces, requiring a multiplicity of different tools, are intended to be produced using a machine tool.

A workpiece of a particular workpiece type is machined by way of a predefined sequence of tools. A tool may in this case by all means be used multiple times in this sequence. The sequence is the same for all workpieces of one workpiece type, for example a car seat. The sequence may be different for workpieces of another workpiece type.

During a working step of the machining of a workpiece by way of a tool from the sequence, the spindle tool, the "predecessor tool" from the previous working step is generally returned back to or put back in its magazine space in the rack magazine. There is then an empty trip to the magazine space for the "successor tool" for the following working step. The latter is then picked up and transported to a provision space. If the current working step, that is to say the machining using the current spindle tool, has ended, then the tool in the spindle is exchanged (for example using a tool changer). If the machining using the spindle tool has ended but the successor tool is not yet available for the following working step, this gives rise to a waiting time for supplying the spindle. These individual waiting times reduce machine efficiency and increase production time. These waiting times should therefore be avoided.

The machining of the workpiece generally requires the use of a large number of different tools. In order, in spite of a wide variety of workpieces to be produced, to allow continuous production, these machine tools have large magazines in which the tools are stored.

In spite of the large capacity, tools have to be continuously removed from these magazines and new tools have to be added. Due to technical restrictions, tools are not able to be placed arbitrarily in the magazine, but rather have to be placed in accordance with their space requirement, for example in accordance with their tool radius and other requirements. Such requirements may be defined by their one or more properties, for example weight of the tool or else tool length. To this end, the one or more properties of the magazine space should for example match the maximum load capacity or else edge space. Finding a permissible space assignment for the tools is a complex task in full large magazines.

In addition to their actual tool property, tools have further characteristics. They differ for example in terms of size and weight. Rack magazines therefore have different types of space for receiving the corresponding tools. Certain spaces may furthermore be blocked in rack magazines due to defects or structural particularities. Diverse conditions therefore have to be met when allocating a space.

A tool is not normally allowed to be placed in any given magazine space, that is to say there are permissible magazine spaces and impermissible magazine spaces for the tool:

The magazine space type of the tool and the magazine space type of the magazine or rack space have to be compatible. By way of example, large tools are thus not allowed to be placed in magazine spaces for small tools, and possibly vice versa.

Tools are not allowed to protrude beyond the edge.

No tools are allowed in blocked magazine spaces.

If tools are too large, then one or possibly even more adjacent magazine spaces have to be left free.

Furthermore, from a production point of view, not all spaces in the magazine are of equal value. In other words, among the permissible magazine spaces, there is a subset of preferred magazine spaces. If for example a tool is used very frequently, then it is expedient to store this at a magazine space that is quickly accessible. A permissible space assignment should therefore not only accommodate all of the tools in the magazine, but also leave certain preferred tools in predefined or predefinable and/or preferred magazine spaces.

If, in a very full magazine with 500 spaces, 10 tools are removed and 15 new tools are added, then it is not desirable if almost all of the tools are allocated a new space. From the machine operator's point of view, it is advantageous for as many tools as possible to remain in their previous space.

SUMMARY

An aspect relates to a permissible magazine space occupancy for the tools in rack magazines while minimizing the number of tools to be relocated in the tool magazine.

Embodiments of the invention claim a method for the computer-aided optimization of the occupancy of magazine spaces with tools within at least one tool magazine for a machine tool, comprising the following steps:

a) acquiring a set of magazine spaces in at least one tool magazine, b) acquiring a first set of tools that occupy at least one magazine space, and their occupied magazine spaces,
c) acquiring a second set of tools that are additionally to be received in the at least one tool magazine,
d) acquiring a space requirement and possibly at least one further property for each tool,
e) acquiring a respective set of permissible magazine spaces for each tool, wherein a permissible magazine space depends on the space requirement and/or at least one further property of the tool and/or a property of the magazine space,
f) acquiring a set of permissible magazine space pairs, wherein a first tool is able to be placed in a first magazine space of the magazine space pair that is permissible for this tool, and a second tool is able to be placed in the second magazine space of the magazine space pair that is permissible for this tool, without any collision in terms of their respective space requirement, and acquiring the size of the free gap between the first already placed tool and the second already placed tool,
g) optimizing the occupancy of the magazine spaces with tools after receiving at least one tool from the second set, such that the number of relocations of the tools from the first set required due to the reception of the tool is minimized, wherein the required relocations of the tools are performed in a compact manner such that the sum of the sizes of the free gaps between two adjacently placed tools is minimized and the magazine space pair of these adjacently placed tools is from the set of magazine space pairs permissible for this tool pair.

In addition to permissible magazine spaces, there are permissible magazine space pairs. In this case, a first tool is placed in a first magazine space of the magazine space pair that is permissible for this tool, and a second tool is placed in the second magazine space of the magazine space pair that is permissible for this tool, without any collision in terms of their respective space requirement. Without any collision in terms of space requirement in this connection means that a tool is able to be transported to or placed in a permissible magazine space without infringing the restrictions mentioned at the outset for a permissible magazine space.

A free gap is the gap located between the spaces and not covered by a tool or by part thereof. The gap may be measured in terms of size. The size may in this case be represented by a volume, a distance or spacing or a diameter, a surface area, etc. There is ideally no or only a small gap between the placed tools. Two adjacent or adjacently placed tools may in this context be understood to mean that no other tool is located between them.

A received tool is intended to be placed such that a smallest possible gap is present or is created between this tool and a tool placed in an adjacent magazine space.

The magazine spaces in the magazine should on the whole be occupied in a manner as compact or as dense as possible. There should be as few possible or no empty magazine spaces between the placed tools. Depending on the space requirement of a tool or depending on the radius/length/width of a tool, it may be placed in its magazine space and in the process fully or partially cover or occupy adjacent magazine spaces. A magazine space may comprise one or more half-spaces. These may be located to the left, to the right or above and below. These are positions in the respective magazine space that are able to be covered by other tools in adjacent magazine spaces.

The magazine spaces may be occupied with tools such that, between the magazine spaces of two adjacently placed tools, the one or more half-spaces located between them are occupied, that is to say as far as possible no half-space is free. "Free" means that the magazine space is not occupied or the half-space is not covered.

The optimization step g) may optionally be repeated multiple times until all of the tools of the second set have been received in the magazine.

A permissible magazine configuration with a minimum number of tools to be relocated is thus found, this being able to be performed quickly and reliably.

One development of embodiments of the invention makes provision for the tools to be picked up and/or (re)located by a magazine device of the tool magazine in accordance with the optimized occupancy or the permissible magazine configuration.

The optimization may be performed by way of mixed integer linear optimization, this being explained in more detail in the respective exemplary embodiments below.

A subset of the tools from the first set that are not allowed to be relocated in each case either by the optimization or by the reception of a tool in another magazine space is predefined or defined.

It is possible, for a subset of the tools from the second subset, to acquire additionally permissible magazine spaces, and the optimization is performed such that these tools are placed in the respectively permissible acquired magazine spaces.

A further aspect of embodiments of the invention makes provision for a control apparatus that is designed in particular to perform the method in accordance with the above-mentioned type and its embodiments. The control apparatus (not shown in FIG. 1) may be a computer added to the machine tool and possibly arranged separately therefrom or a control module integrated into the machine tool.

The control apparatus for the computer-aided optimization of the occupancy of magazine spaces with tools within at least one tool magazine for a machine tool may have:
a) a first acquisition unit that is designed to acquire a set of magazine spaces in at least one tool magazine,
b) a second acquisition unit that is designed to acquire a first set of tools that occupy at least one magazine space and their occupied magazine spaces,
c) a third acquisition unit that is designed to acquire a second set of tools that are additionally to be received in the at least one tool magazine,
d) a fourth acquisition unit that is designed to acquire a space requirement for each tool and possibly at least one further property for each tool,
e) a fifth acquisition unit that is designed to acquire a respective set of permissible magazine spaces for each tool, wherein a permissible magazine space depends on the space requirement and/or at least one further property of the tool and/or a property of the magazine space,
f) a sixth acquisition unit that is designed to acquire the set of permissible magazine space pairs, wherein a first tool is able to be placed in a first magazine space of the magazine space pair that is permissible for this tool and a second tool is able to be placed in the second magazine space of the magazine space pair that is permissible for this tool without any collision in terms of their respective space requirement, and to acquire the size of the free gap between the first already placed tool and the second already placed tool,
g) an optimization unit that is designed to optimize the occupancy of the magazine spaces with tools of the first set and at least one tool to be received from the second set, such that the number of relocations of the tools from the first set required due to the reception of the tool is minimized, wherein the required relocations and (initial or new) placements of the tools from the second set of tools is performed in a compact manner such that the sum of the sizes of the free gaps between two adjacently placed tools is minimized and the magazine space pair of these adjacently placed tools is from the set of magazine space pairs permissible for this tool pair.

In this case, the first, second, third, fourth, fifth and sixth acquisition unit may be integrated into an acquisition unit in any combination in twos, threes, fours or fives.

The control apparatus (not shown in FIG. 1) may be a computer added to the machine tool and possibly arranged separately therefrom or a control module integrated into the machine tool.

A further aspect of embodiments of the invention is a computer program (product) f program code means for performing the method as claimed in one of the preceding method claims when it runs on a control apparatus of the abovementioned type or is stored on a computer-readable medium.

The computer program or computer program product (non-transitory computer readable storage medium having instructions, which when executed by a processor, perform actions) may be stored on a computer-readable medium. The computer program or computer program product may be created in a conventional programming language (for example C++, Java). The processing apparatus may comprise a commercial computer or server having appropriate input, output and storage means. This processing apparatus may be integrated in the control apparatus or in the means thereof.

The control apparatus and the computer program (product) may be designed and developed in the same way as the abovementioned method.

BRIEF DESCRIPTION

Some of the embodiments will be described in detail, with references to the following Figures, wherein like designations denote like members, wherein.

DETAILED DESCRIPTION

Figure 1:
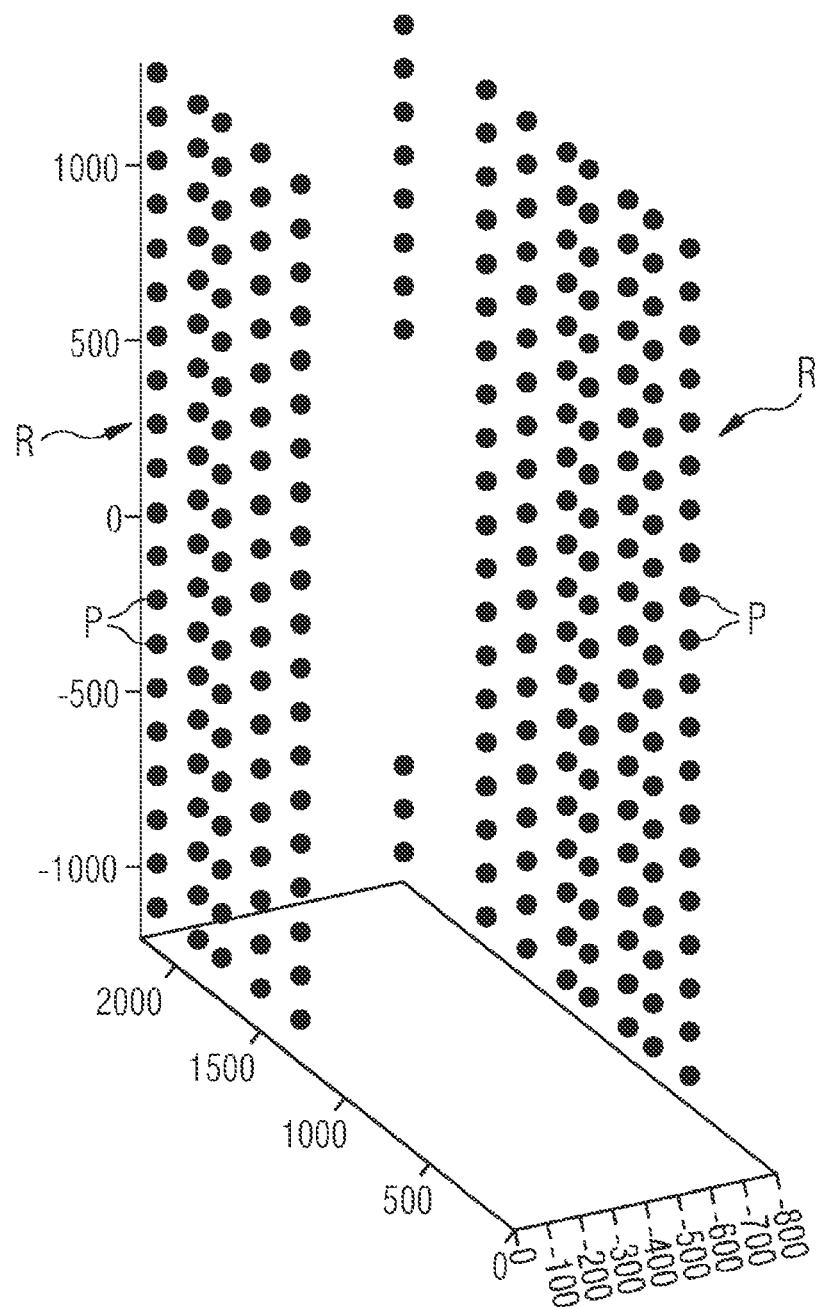
FIG. 1 shows conventional spaces in a rack magazine, wherein the main side is arranged on the right and the opposite side is arranged on the left.

One special case of optimization methods is that of linear optimization. This deals with the optimization of linear objective functions over a set that is restricted by linear equations and inequalities. It forms the basis for (mixed) integer linear optimization solution methods. A so-called solver is a collective term for special mathematical computer programs that are able to numerically solve mathematical problems. In connection with MILP (mixed integer linear programming), standard solvers, such as for example CPLEX, Scip, Gurobi and Xpress, may be used for IP programs (integer optimization models).

One example is described below in which computer-aided optimization of the occupancy of magazine spaces with tools within at least one tool magazine for a machine tool is performed by way of an MILP (mixed integer linear programming) model. This process may be performed independently of the heuristics and repositioning methods described above.

Since the removal of tools only leads to additional free magazine spaces and also does not have any further influence or restrictions for the desired optimized occupancy of the magazine spaces, the removal of the tools is already ruled out in the example, and tools are only added to the magazine.

The optimization calculation therefore has to be performed by a control device quickly enough that it is able to be used as part of an interactive process in which the reception of the tools successively leads to a permissible result.

The following are acquired as input parameters:

The set of tools located in the magazine with their occupied magazine spaces.

The set of tools to be inserted into or received in the magazine.

For each tool located in or to be added to the magazine
its space requirement,
the magazine spaces permissible for this tool,
the magazine spaces preferred for this tool,
the set of magazine spaces available in the magazine.

The result is an optimized occupancy of the magazine spaces. In this case, the following values may be output:
yes-no statement (1-0 value) as to whether there is a permissible magazine space assignment under the given requirements.

In the case of a yes statement regarding the permissibility, the following are furthermore output:
For each tool to be inserted, its allocated magazine space.
For each tool located in the magazine and to be relocated, its new allocated magazine space.

The complexity when filling the rack magazine results from the space restrictions to be complied with for the tools. On the one hand, not every tool is allowed to be stored in every space. For instance, in some magazines, there are special permissible spaces for the property "heavy" of the tools or the property "particularly long" of the tools. The set of magazine spaces in which a specific tool is able to be placed are referred to as magazine spaces permissible for the tool. The permissible magazine spaces for a tool are not all of the same good suitability. A subset of the permissible spaces may therefore be distinguished as preferred spaces for a tool. In addition to these restrictions, restrictions also arise due to the space requirement of the tools in the magazine. Tools may also protrude beyond the area of a magazine space due to their size. This may lead to restrictions for spaces at the magazine edge or caused by other tools in the magazine.

The following input parameters may additionally expediently be added:
The set of tools provided with a set magazine space.
The set of tools to be inserted in a set space with their magazine spaces.

Figure 2A:
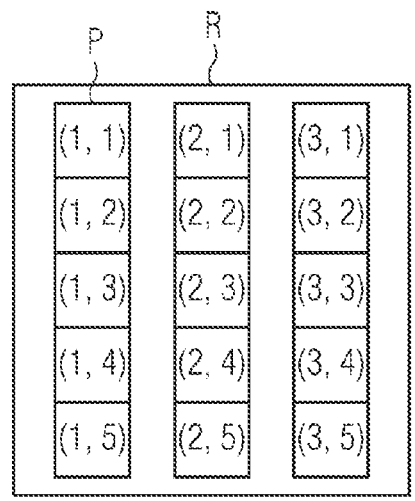
FIG. 2A shows a simplified example of a rack magazine with magazine spaces.

FIG. 2A shows a simplified rack magazine R with magazine spaces P, these being indicated by (1,1) to (1,5) for the first column, by (2,1) to (2,5) for the second and by (3,1) to (3,5) for the third column, by way of example.

Figure 2B:
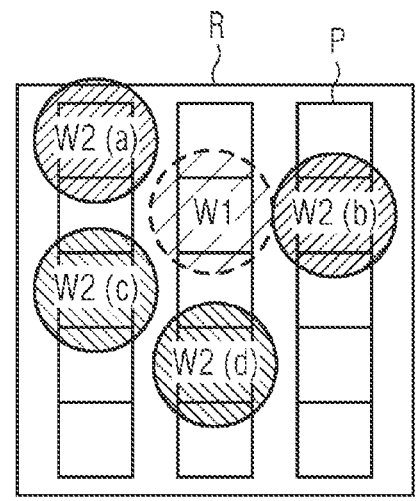
FIG. 2B shows one example of permissible and impermissible space assignments.
Figure 3A:
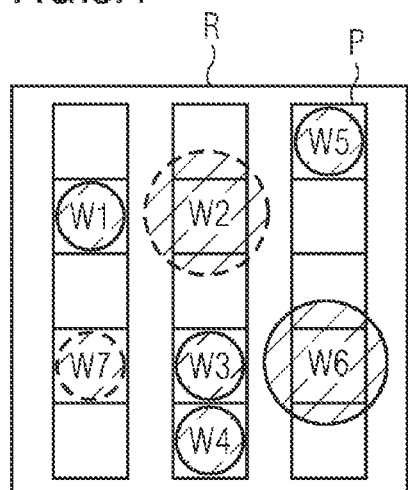
FIG. 3A shows a starting occupancy.
Figure 3B:
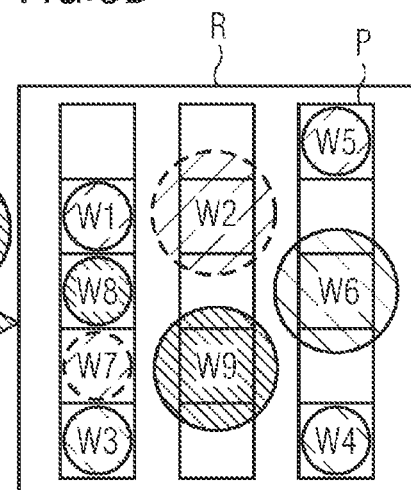
FIG. 3B shows a permissible occupancy following the addition of two tools.
Figure 4A:
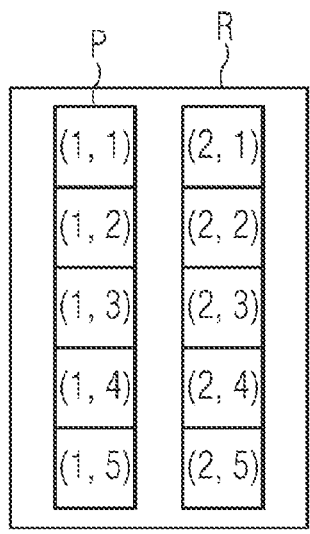
FIG. 4A shows a simplified example of a rack magazine with magazine spaces.

The example thus depicts a rack magazine with 15 magazine spaces, arranged in three magazine columns and five magazine rows. FIG. 2A and FIG. 4A depict the indexing. For example, (2,3) thus denotes the magazine space in the second column and third row. FIG. 2B depicts permissible and impermissible magazine space assignments. In FIGS. 2B, 3A and 3B, tools are denoted by W1 to W9. The starting point in FIG. 2B is a magazine filled with a tool W1. W1 is denoted as a circle in terms of its space requirement, for example the tool radius. The tool W2 is additionally intended to be added to the magazine. W2 marked with (c) and W2 marked with (d) are permissible spaces and W2 marked with (a) and W2 marked with (b) are impermissible spaces. The space (1,1) is impermissible since W2(a) collides with the magazine edge there. The space (3,2) is likewise impermissible, since W2(b) collides with the tools W1 there. The spaces (1,3) and (2,4) are for example permissible, since W2(c) and W2(d) would not collide either with the edge or with W1 there.

FIGS. 3A and 3B illustrate a specific situation including a permissible space assignment by way of example. FIG. 3A depicts the starting situation of a magazine equipped with seven tools W1 to W7. The tools W2 and W7, with a dashed circle, are not allowed to be allocated to a new space. These accordingly each remain in a set space. All of the other tools are able to be relocated. Two further tools W8 and W9 are intended to be inserted into this magazine. Due to its space requirement, W9 cannot be stored on an upper or lower edge space (1,1), (2,1), (3,1), (1,5), (2,5), (3,5). W9 is also not able to be stored in the spaces (1,3), (2,3), (3,2) since it would collide with the non-movable tools W2 and W7 there. W8 on the other hand cannot be stored in the spaces (2,1) and (2,3), since it would collide with W2 there.

FIG. 3B depicts a permissible space assignment. Three tools located in the magazine have been relocated, these being illustrated in striped form, and the two new tools W8 and W9 have been inserted. The three tools W3, W4 and W6 have been relocated in order to create space for the tool W9.

The described problem is able to be solved in two stages. In the first stage, preprocessing, the problem is transformed into an equivalent simplified problem such that no further space restrictions caused by the magazine edge need to be taken into consideration. In the second stage, the simplified problem is formulated as an integer linear problem (MILP) and solved using a suitable solver. In the event of success, a permissible space assignment is determined in which the minimum possible number of tools located in the magazine is assigned to a new space. In the event of failure, there is no permissible space assignment for all of the tools to be added.

Two types of space restriction have been described in the above example: firstly collisions with the magazine edge and secondly collisions between tools in the magazine. The first type of restriction, magazine edge, depends only on the tool and the selected space. In other words, this type of restriction may be considered equivalently through space permissibility. Preprocessing removes, from the set of spaces permissible for a tool, all of the spaces at which there are collisions with the magazine edge. Following the preprocessing, each tool may thus be stored in an empty magazine in any space permissible for the tool.

The following designations apply in the MILP formulation:
Indices:
 L Set of all magazine spaces
 T Set of all tools
 $T_N$ Set of all tools to be inserted
 $T_O$ Set of all tools present in the magazine
  $T_F$ Set of all tools fixed in a set space, $T_F \subset T_N \cup T_O$.
 $L_t$ Set of all permissible spaces for tool t
Parameters
 $l_t$ The set space of tool $t \in T_F$.
 $l_t$ The original space of tool $t \in T_O$.
  $\text{cov}_{t,l}^t$ Covered portion of the gap between the spaces l and $l_1$,
  when tool t is located in space l, $0 \leq \text{cov}_{t,l}^t \leq 1$.
Variables:
 $\text{setup}_{t,l}$ Space assignment of tool t to space l. (Value 1 when the tool is allocated to the space, and 0 otherwise.)

Using this notation, the problem may be formulated as the following integer linear program. The number of tools no longer located in their original space is to be minimized.
Minimization Function:

$$\sum_{t \in T_O} 1 - \text{setup}_{t,l_t}$$

Additional Conditions:
(1) Each tool must be allocated to a magazine space.

$$\sum_{l \in L} \text{setup}_{t,l} = 1, \, t \in T$$

(2) No magazine space is allowed to be allocated multiple times.

$$\sum_{t \in T} \text{setup}_{t,l} \leq 1, \, l \in L$$

(3) Only permissible magazine spaces are allowed to be allocated.

$$\sum_{l \in L \setminus L_T} \text{setup}_{t,l} = 0, \, t \in T$$

(4) Fixed tools must be assigned to their set space.

$$\text{setup}_{t,l_t} = 1, t \in T_F$$

(5) Spaces covered by a tool are not allowed to be occupied by tools and two tools are not allowed to collide.

$$\sum_{t \in T} \text{cov}_{t_1,l_2}^t \cdot \text{setup}_{t,l_1} + \sum_{t \in T} \text{cov}_{t_2,l_1}^t \cdot \text{setup}_{t,l_2} \leq 1, \, l_1, l_2 \in L, l_1 \neq l_2$$

These inequalities ensure that two tools are placed in a permissible magazine space pair. Magazine space pairs acquired or determined as permissible guarantee collision-free occupancy thereof with tools in terms of their respective space requirement.

This integer program has exactly one solution when there is a permissible space assignment of the tools in the magazine in which the fixed tools are each assigned their set space.

The last-mentioned group of restrictions (5), for taking into consideration the space requirements of the tools, comprise a large number of superfluous inequalities. For many magazine space pairs $l_1, l_2 \in L, l_1 \neq l_2$, these inequalities are always met because the two magazine spaces of the magazine space pair lie very far apart from one another. It makes sense to consider magazine space pairs in which there is a tool pair that is able to be stored in these magazine spaces and collides. If there is not such a tool pair, then the inequalities do not have any restrictive character and may be omitted.

Solutions to the above mathematical program may contain a large number of unwanted small empty spaces or free gaps between the placed tools. In particular when the magazine is not yet very full, the tools may be stored at a large number of different positions. When subsequently adding further tools to the magazine, the empty positions that are present may be too small for the new tools and force relocation of the tools already located in the magazine. It is therefore advantageous, right from the beginning of magazine occupancy, to act such that, where possible, small free gaps between tools are avoided. In order to achieve compact magazine occupancies as a solution, the above mathematical program may be expanded.

Variables:
$b_{l_1,l_2}$ Simultaneous occupancy of both spaces $l_1$ and $l_2$ by tools, such that no/small empty positions (the smallest possible size of the gap or no gap) remains between the tools. (Value 1 when both spaces are occupied without an empty position, and 0 otherwise.).

Additional Conditions:
(6) Identifying empty positions between tools.

$$\sum_{t \in T} \text{cov}^t_{l_1,l_2} \cdot \text{setup}_{t,l_1} + \sum_{t \in T} \text{cov}^t_{l_2,l_1} \cdot \text{setup}_{t,l_2} \geq \alpha \cdot b_{l_1,l_2}, l_1, l_2 \in L, l_1 \neq l_2$$

The left-hand part of term (6), due to the above additional conditions (5), is able to be 1 at most. If a suitable number less than or equal to 1 is selected as $\alpha$, then $b_{l_1,l_2}$ is only able to adopt the value 1 when at least one component of $\alpha$ of the space between the positions $l_1$, $l_2$ is covered by the tools placed there. In other words, the variables $b_{l_1,l_2}$ count the number of tools that are placed very close to one another. Using the following objective function:

$$\sum_{l_1,l_2 \in L, l_1 \neq l_2} b_{l_3,l_2}$$

the tools are always placed as close as possible or adjacent to another tool in an optimum solution.

Figure 4B:
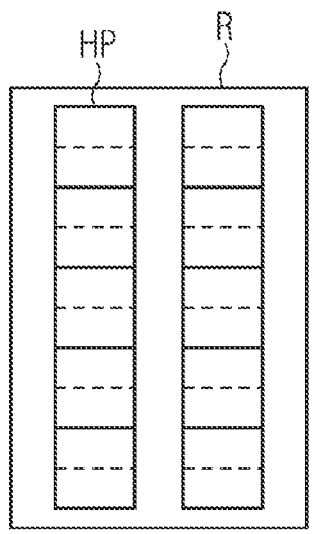
FIG. 4B shows an exemplary magazine with subspaces.
Figure 4C:
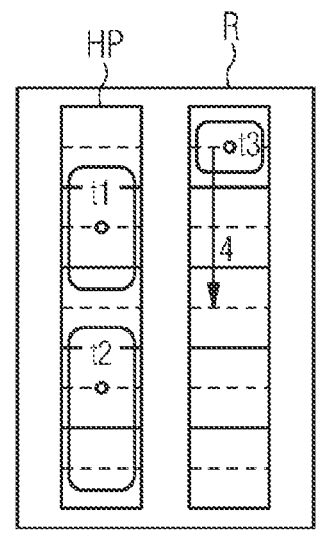
FIG. 4C shows an exemplary magazine with subspaces.

The control systems of machine tools offer various types of rack magazine management. One possible type, for example in sinumetric control systems, is the half-space model. A half-space is a special form of subspace. The subspace model allows for example a magazine space to be partially occupied by a tool. For the sake of clarity, consideration is given below to a magazine, shown for example in FIG. 4A, in which the columns are independent. In other words, in the example, only half-spaces above and below are considered. FIG. 4B schematically illustrates a magazine R with two columns and five rows. The spaces are indicated in FIG. 4A and the division into half-spaces HP is illustrated in FIG. 4B. FIG. 4C shows collision-free occupancy with three tools t1, t2 and t3 in the spaces (1,2), (1,4) and (2,1).

One special feature in the half-space model is that tools do not have to be symmetric. Tool t1 takes up two half-spaces upwardly and downwardly, respectively. On the other hand, tool t2 takes up two half-spaces upwardly and three half-spaces downwardly (cf. FIG. 4C). Both tools overlap the space (1,3) but do not collide there, since they each cover only the upper, respectively lower, half-space.

The coverage parameter $\text{cov}_{l,l}^t$ may be determined using the size of the gap as quotient of the size of the gap covered by t and the overall size of the gap. As a specific form with half-spaces, this coverage parameter corresponds to the quotient of the number of half-spaces located between them and covered by t and the total number of half-spaces located between them.

Although embodiments of the invention has been described and illustrated in more detail through the preferred exemplary embodiment, embodiments of the invention are not restricted by the disclosed examples, and other variations may be derived therefrom by a person skilled in the art without departing from the scope of protection of embodiments of the invention.

The processes or method sequences described above may be implemented on the basis of instructions that are present on computer-readable storage media or in volatile computer memories (referred to below collectively as computer-readable memories). Computer-readable memories are for example volatile memories such as caches, buffers or RAM and non-volatile memories such as interchangeable data carriers, hard drives, etc.

The functions or steps described above may in this case be present in the form of at least one set of instructions in/on a computer-readable memory. The functions or steps are in this case not tied to a particular set of instructions or to a particular form of sets of instructions or to a particular storage medium or to a particular processor or to particular execution schemes, and may be executed by software, firmware, microcode, hardware, processors, integrated circuits etc. operating on their own or in any combination. In this case, a wide variety of processing strategies may be used, for example serial processing by an individual processor or multiprocessing or multitasking or parallel processing, etc.

The instructions may be stored in local memories, but it is also possible to store the instructions on a remote system and access this via a network.

"Computer-aided" in connection with embodiments of the invention should be understood to mean for example an implementation of the method in which a processor in particular executes at least one method step of the method.

The term "processor", "central signal processing", "control unit" or "data evaluation means" as used here comprises processing means in the broadest sense, that is to say for example servers, universal processors, graphics processors, digital signal processors, application-specific integrated circuits (ASICs), programmable logic circuits such as FPGAs, discrete analog or digital circuits and any combinations thereof, including all other processing means known to a person skilled in the art or developed in the future. Processors may in this case consist of one or more devices or apparatuses or units. If a processor consists of multiple devices, these may be designed or configured for the parallel or sequential processing or execution of instructions. A "storage unit" in connection with embodiments of the invention may be understood to mean for example a memory in the form of working memory (random access memory, RAM) or a hard disk.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for a computer-aided optimization of an occupancy of magazine spaces with tools within at least one tool magazine for a machine tool, the method comprising:
   a) acquiring a set of magazine spaces in at least one tool magazine;
   b) acquiring a first set of tools that occupy at least one magazine space, and occupied magazine spaces;
   c) acquiring a second set of tools that are additionally to be received in the at least one tool magazine;
   d) acquiring a space requirement and at least one further property for each tool;
   e) acquiring a respective set of permissible magazine spaces for each tool, wherein a permissible magazine space depends on a space requirement and/or at least one further property of the tool and/or a property of the magazine space;
   f) acquiring a set of permissible magazine space pairs, wherein a first tool is able to be placed in a first magazine space of the magazine space pair that is permissible for the first tool, and a second tool is able to be placed in a second magazine space of the magazine space pair that is permissible for the second tool, without any collision with respect to respective space requirement, and acquiring a size of a free gap between the first already placed tool and the second already placed tool; and
   g) optimizing, by way of mixed integer linear optimization, the occupancy of the magazine spaces with tools of the first set and at least one tool to be received from the second set, such that a number of relocations of the tools from the first set required due to a reception of the tool of the second set is minimized, wherein required relocations and placements of the tools from the second set are performed in a compact manner such that a sum of the sizes of the free gaps between two adjacently placed tools is minimized and the magazine space pair of these adjacently placed tools is from the set of magazine space pairs permissible for the tool pair.

2. The method as claimed in claim 1, wherein the optimization step g) is repeated multiple times until all of the tools of the second set have been received in the magazine.

3. The method as claimed in claim 1, wherein the tools of the first set and/or the tools of the second set are picked up and/or relocated by a magazine device of the tool magazine in accordance with the optimized occupancy.

4. The method as claimed in claim 1, wherein a subset of the tools from the first set that are not allowed to be relocated in each case either by the optimization or by the reception of a tool in another magazine space is predefined.

5. The method as claimed in claim 1, wherein for a subset of the tools from the second set, additional permissible magazine spaces are acquired and the optimization is performed such that these tools are placed in the respectively permissible acquired magazine spaces.

6. A control apparatus for a computer-aided optimization of the occupancy of magazine spaces with tools within at least one tool magazine for a machine tool, the control apparatus comprising:
   one or more processors configured to:
   a) acquire a set of magazine spaces in at least one tool magazine;
   b) acquire a first set of tools that occupy at least one magazine space and occupied magazine spaces;
   c) acquire a second set of tools that are additionally to be received in the at least one tool magazine;
   d) acquire a space requirement for each tool and at least one further property for each tool;
   e) acquire a respective set of permissible magazine spaces for each tool, wherein a permissible magazine space depends on the space requirement and/or at least one further property of the tool and/or a property of the magazine space;
   f) acquire the set of permissible magazine space pairs, wherein a first tool is able to be placed in a first magazine space of the magazine space pair that is permissible for the first tool and a second tool is able to be placed in a second magazine space of the magazine space pair that is permissible for the second tool without any collision with respect to respective space requirement, and to acquire a size of a free gap between the first already placed tool and the second already placed tool; and
   g) optimize, by way of mixed integer linear optimization, the occupancy of the magazine spaces with tools of the first set and at least one tool to be received from the second set, such that a number of relocations of the tools from the first set required due to the reception of the tool of the second set is minimized, wherein required relocations and placements of the tools from the second set is performed in a compact manner such that a sum of the sizes of free gaps between two adjacently placed tools is minimized and the magazine space pair of these adjacently placed tools is from the set of magazine space pairs permissible for the tool pair.

7. The control apparatus as claimed in claim 6, wherein a subset of the tools from the first set that are not allowed to be relocated in each case either by the optimization or by the reception of a tool in another magazine space is predefined.

8. A computer program product, comprising a non-transitory computer readable hardware storage device having computer readable program code stored therein, said program code executable by a processor of a computer system to implement a method comprising:
   a) acquiring a set of magazine spaces in at least one tool magazine;
   b) acquiring a first set of tools that occupy at least one magazine space, and occupied magazine spaces;
   c) acquiring a second set of tools that are additionally to be received in the at least one tool magazine;
   d) acquiring a space requirement and at least one further property for each tool;
   e) acquiring a respective set of permissible magazine spaces for each tool, wherein a permissible magazine space depends on a space requirement and/or at least one further property of the tool and/or a property of the magazine space;
   f) acquiring a set of permissible magazine space pairs, wherein a first tool is able to be placed in a first magazine space of the magazine space pair that is permissible for the first tool, and a second tool is able to be placed in a second magazine space of the magazine space pair that is permissible for the second tool, without any collision with respect to respective space requirement, and acquiring a size of a free gap between the first already placed tool and the second already placed tool; and g) optimizing, by way of mixed integer linear optimization, the occupancy of the magazine spaces with tools of the first set and at least one tool to be received from the second set, such that a number of relocations of the tools of from the first set required due to a reception of the tool of the second set is minimized, wherein required relocations and placements of the tools from the second set are performed in a compact manner such that a sum of the sizes of the free gaps between two adjacently placed tools is minimized and the magazine space pair of these adjacently placed tools is from the set of magazine space pairs permissible for the tool pair.

* * * * *